(12) United States Patent
Clark (10) Patent No.: US 8,659,686 B1
(45) Date of Patent: Feb. 25, 2014

(54) TARGET DETECTION SYSTEMS AND METHODS

(75) Inventor: Frank O. Clark, Falmouth, MA (US)

(73) Assignee: The United States of America as Represented by the Secretary of the Air Force, Washington, DC (US)

( * ) Notice: Subject to any disclaimer, the term of this patent is extended or adjusted under 35 U.S.C. 154(b) by 130 days.

(21) Appl. No.: 13/465,950

(22) Filed: May 7, 2012

(51) Int. Cl.
*H04N 9/083* (2006.01)
*H04N 5/225* (2006.01)
*G06K 9/00* (2006.01)

(52) U.S. Cl.
USPC ............ 348/270; 348/360; 348/169; 382/103

(58) Field of Classification Search
USPC ........... 348/266–270, 272, 273, 360; 382/103
See application file for complete search history.

(56) References Cited

U.S. PATENT DOCUMENTS

| | | | |
|---|---|---|---|
| 7,969,576 B1 * | 6/2011 | Buckley et al. ............... | 356/437 |
| 7,999,935 B2 * | 8/2011 | Dyba ............................ | 356/301 |
| 2008/0106925 A1 * | 5/2008 | Paz de Araujo et al. ...... | 365/148 |
| 2009/0177428 A1 * | 7/2009 | Iden ............................... | 702/94 |
| 2010/0327783 A1 * | 12/2010 | Tansu et al. ................... | 315/363 |
| 2011/0001855 A1 * | 1/2011 | Matsuoka ...................... | 348/273 |
| 2012/0033113 A1 * | 2/2012 | El-Ghoroury et al. ........ | 348/272 |

* cited by examiner

*Primary Examiner* — Chia-Wei A Chen
(74) *Attorney, Agent, or Firm* — James M. Skorich (57) ABSTRACT

System and methods of target detection utilize quantum mechanical transition in surface material of a target, such as a weather balloon in flight against a background (sky, clouds), to produce an inflection in spectral reflectance. The system includes at least two filters alternating in front of the lens as the camera attempts to acquire alternate filtered data. The filters can include a rotating filter wheel with two filters alternately sampling the brightest and darkest points around an inflection point in the spectral reflectance curve of the target's material. Target material is observed to blink, or alternate between bright and dark, as filters alternate in front of the camera lens while the background is unchanging, rendering optimal first detection of the target, and may be readily automated. The described process can use a filter wheel, but use of an electrically tunable filter can provide a device with no moving parts.

20 Claims, 6 Drawing Sheets

TARGET DETECTION SYSTEMS AND METHODS

STATEMENT OF GOVERNMENT INTEREST

The conditions under which this invention was made are such as to entitle the Government of the United States under paragraph 1(a) of Executive Order 10096, as represented by the Secretary of the Air Force, to the entire right, title and interest therein, including foreign rights.

TECHNICAL FIELD OF THE INVENTION

The present invention is generally related to systems and methods for target detection. More particularly, the present invention is related to systems and methods achieving passive multicolor detection of surface reflectance changes on a material surface as a function of wavelength or frequency of an object.

BACKGROUND OF THE INVENTION

Quantum mechanical resonances, in this case molecular vibrational transitions, are generally narrow in wavelength or frequency, and cause apparent changes in the surface properties of a target over such narrow wavelength regions. Viewed against a background that is different from a target's material, imaging the background on and off the wavelength of such a quantum mechanical transition makes the object sought, e.g., either natural or synthetic latex, or related material, to appear alternately brighter and dimmer, while the background, which if not of the same material will not exhibit such a change, thus making the object with the quantum mechanical transition stand out by appearing to blink. The present inventor has found that such a technique renders an object, such as a weather balloon, easy to detect against a background. Otherwise, such a balloon, or similar object, if not carrying a light or other emissive device, is exceedingly difficult to detect at large distances. The technique has-been demonstrated through a new system by the present inventor to function extremely well in detecting a balloon against sky backgrounds, clouds, or trees, and is quite general in nature. This technique is not just one of reducing background clutter, but more importantly makes the sought object stand out.

SUMMARY OF THE INVENTION

System and methods of the present invention are effective for target detection and utilize quantum mechanical transition in surface material of the target, such as a weather balloon in flight against a background (sky, clouds), to produce an inflection in spectral reflectance.

It is a feature of the present invention to provide a system that includes at least two filters alternating in front of the lens of a camera as the camera attempts to acquire alternate filtered data from a target. The filters operate with the camera to alternately sample the brightest and darkest points around an inflection point in the spectral reflectance curve of the target's material. When acquiring a target utilizing the present invention, target material, is observed to blink, or alternate between bright and dark, as the at least two filters alternate, while the background remains unchanged.

It is another feature of the present invention that the at least two filters can be provided in the form of a rotating filter wheel including two filters types alternately covering the camera lens as the rotating filter wheel moves in front, of the lens and samples the brightest and darkest points around an inflection point in the spectral reflectance curve of the balloon material.

It is also a feature of the present invention that the at least two filters alternatively operating in front of the lens can be provided in the form of an electrically tunable filter producing at least two filtering conditions.

It is yet another feature of the present invention to provide a method for detecting a target utilizing quantum mechanical transitions in surface material on the target that produces an inflection in spectral reflectance that includes optically acquiring images as alternate filtered data using a camera including a lens and at least two filters alternatively operating in front of the lens, wherein the filters alternatively sample brightest and darkest points around an inflection point along a spectral reflectance curve on a material of any target represented in the images, background balancing and differencing alternate filtered data, and detecting anomalies in the alternate filtered data, wherein the anomalies represent a detected target.

DETAILED DESCRIPTION

The present invention relates generally to passive multicolor detection, in this case imaging, of the surface reflectance changes as a function of wavelength or frequency of an object, in this instance sharp reflection changes caused by molecular vibrations in the material, and image frame difference analysis. Alternating at least two filter types in front of the detector alternately reveal the highly reflective (bright) wavelength and the poorly reflecting (dark) wavelength. The physics of the technique therefore cause the sought surface (balloon) to appear to blink while the background remains the same, rendering very easy detection. This apparent blinking renders a target, such as a weather balloon, very easy to detect at great distances.

Figure 1:
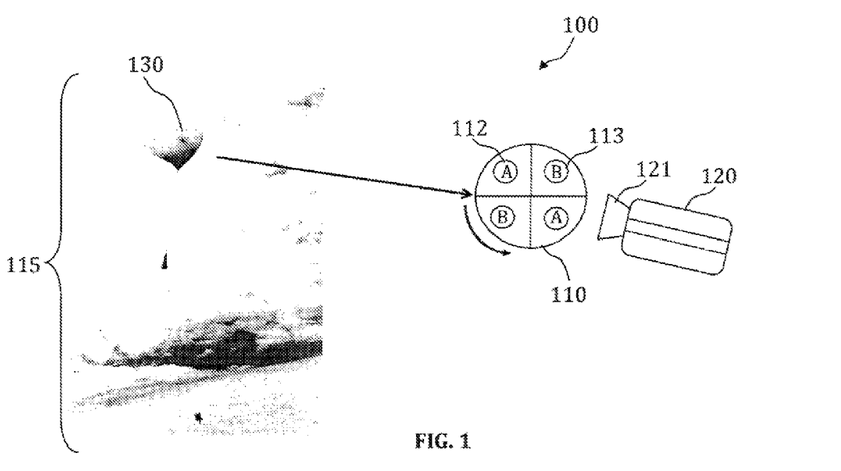
FIG. 1 illustrates a diagram of a basic concept of the present invention that can be used to detect a weather balloon.

Referring to FIG. 1, a diagram 100 of the basic concept of the present invention used to detect a weather balloon floating in a background 115 is illustrated. A filter wheel 110 is shown with filters 112/113 designed to exploit the quantum mechanical transition of a target 130 causing surface spectral reflectance changes in the target 130 when the filter wheel 110 is rotated in front of the lens 121 of a camera 120 as the assembly is pointed at the target. The target exhibits spectral reflectance, changes when alternately covered by the filters compared to the background, which remains unchanged.

Figure 2:
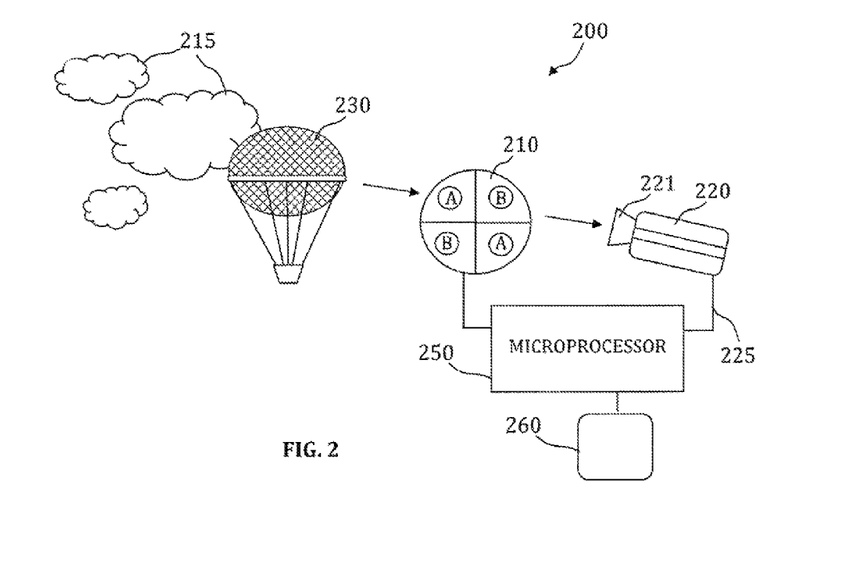
FIG. 2 illustrates a diagram of a system in accordance with features of the present invention.

Referring to FIG. 2, a diagram 200 of a system in accordance with features of the present invention is shown. A camera 220 including a lens 221 and at least two filters 210 are provided to acquire images from a target 230. The at least two filters are placed between the camera 220 and the target 230. The at least two filters 210 exploit the quantum mechanical transition of a target 230 causing surface spectral reflectance changes in the target 230 when the at least two filters 210 are alternated in front of a camera 220 as the camera 220 is pointed at and acquiring images from the target 230, despite its background 215 The camera output 225 can then analyzed processed by a microprocessor 250. Images can then be displayed on a display 260 for human analysis, or the detection may be automated and input into a decision system.

When an actual filter wheel 110 is used, an operator has full control over the rate of apparent blink (alternate bright and dark reflectance) of the object sought by controlling the filter wheel's rotation rate. In this case, the apparent blink rate of the target is directly related to the rotation or spin rate of the filter wheel on the camera, meaning that the camera frame rate and filter wheel spin rate may be readily adjusted by the operator to optimize detection under any conditions, should this be desirable. The operator determines the rate of blink, via the rate of filter wheel spin. Where an electrically tunable filter is used to produce the at least two filtering conditions for the at least two filters 210, the blink rate can be set and controlled electronically by the microprocessor 250 or other electronics that can be directly associated with the electrically tunable filter. Use of an electrically tunable filter would provide an entire device with no moving parts, which may be ideal in certain field settings (such as remote deployment). In either case, the filtering technique works to detect the target against a generally spectrally different background 215 such as against a blue sky, clouds, or terrestrial backgrounds, as they will not exhibit the specific quantum mechanical transition causing surface spectral reflectance, change for which the present invention was specifically designed.

The present invention includes a method for rendering targets, such as free-floating weather balloons, easy to detect with automated relatively inexpensive instrumentation. For a given surface material, in the case of a balloon would include natural or artificial latex, alternating filtration by the at least two filters controls the detected, phenomenon. In the case of a manually used filter 110 when, the device operator, by controlling the spin rate of the filter wheel 110, has total control over the detected phenomenon. In the case of an electronically tuned filter, a microprocessor controls detection. The detection technique applies to any material that exhibits wavelength dependent spectral reflectance that is different from the exhibited wavelength dependent spectral reflectance of the background 115, whatever that material or background might be in any particular case.

Figure 3:
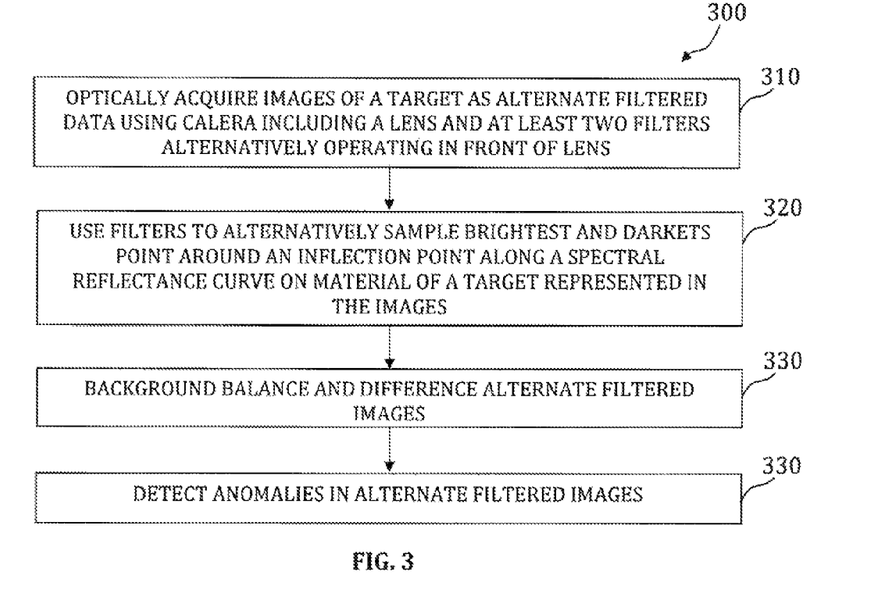
FIG. 3 illustrates a flow diagram for a method of detecting a target in accordance with features of the present invention.

Referring to FIG. 3, a flow diagram 300 is provided that illustrates a method in accordance with features of the present invention. The method is for detecting a target utilizing quantum mechanical transitions in surface material on the target that produces an inflection in spectral reflectance. As shown is Block 310, images of a target are optically acquired as alternate filtered data using a camera including a lens and at least two filters alternatively operating in front of the lens. As shown is Block 320, the filters alternatively sample brightest and darkest points around an inflection point along a spectral reflectance curve on a material of a target represented in the images. The alternate filtered images are background balanced and differenced as shown is Block 330. Then as shown in Block 340, anomalies are detected in the alternate filtered data. The anomalies represent a detected target.

Figure 4:
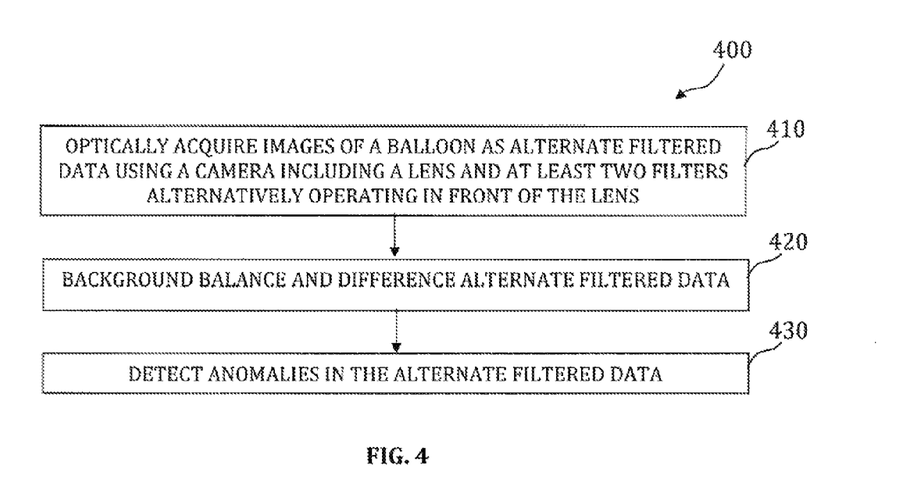
FIG. 4 illustrates a flow diagram for another method of detecting a target in accordance with features of the present invention.

Referring to FIG. 4, a flow diagram 400 is provided illustrating another method in accordance with features of the present invention. The flow diagram outlines the steps for detecting a balloon utilizing quantum mechanical transitions on a surface material of the balloon that produces an inflection in spectral reflectance. As shown in Block 410, images of a balloon are optically acquired as alternate filtered data using a camera including a lens and at least two filters alternatively operating in front of the lens. The filters alternatively sample brightest and darkest points around an inflection point along a spectral reflectance curve on material of the balloon represented in the images. Alternate filtered data is background balanced and differenced as shown in Block 420. Then as shown in Block 430, anomalies in the alternate filtered data are detected, wherein the anomalies represent a detected target.

Figure 5:
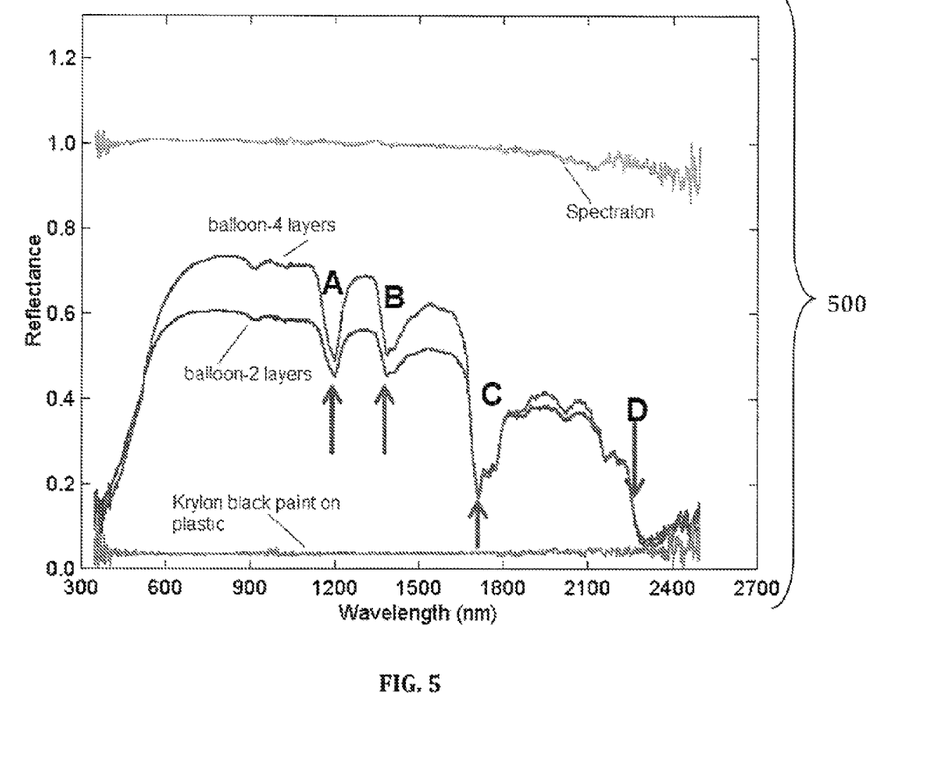
FIG. 5 illustrates a graph of spectral reflectance measurements when a wheel-based filter is utilized.
Figure 6:
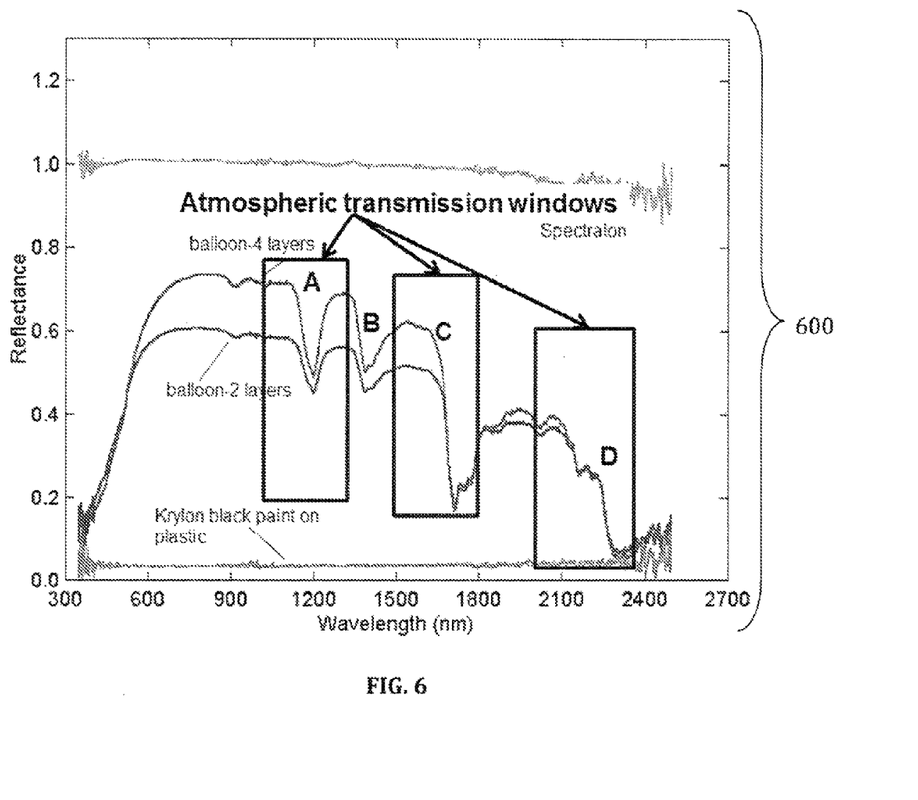
FIG. 6 illustrates a graph of atmospheric transmission bands overlayed near four inflection points to search for correspondence.

Referring to FIG. 5, a graph is provided to show spectral reflectance measurements when a wheel-based filter is utilized. Spectral reflectance measurement of balloon material against a sky background shows four very clear reflectance inflection points, labeled A, B, C, and D, where the material goes from bright to dark as a function of wavelength. Scales are of spectral reflectance, from 0 to 1, with 0 being perfectly absorbing and 1 being a perfect reflector, versus wavelength in nanometers. In this specific application, it is desired to detect the material at the greatest possible distance through the atmosphere. Atmospheric transmission bands are overlayed near the four inflection points to search for correspondence, as shown in the graph illustrated in FIG. 6. It is clear that the three surface reflectance inflection points labeled A, C, and D fall within atmospheric transmission windows, and therefore may be detected at greatest distance, while point B falls within an atmospheric absorption area. Therefore the technique, in this particular instance, is applied to that inflection point with the greatest change in reflectance that falls within an atmospheric transmission window, which in this case is clearly seen to be point C.

During testing, the sky background brightness remains the same, while the balloon material clearly exhibits a very large change in reflectance properties going from much brighter than the surrounding sky to much darker than the surrounding sky. Thus when the filter wheel is rotated, the balloon material appears to "blink," while the sky remains unchanging, rendering the balloon readily detectable against the sky, clouds, or terrestrial background, none of which exhibit the specific quantum mechanical vibrational transition exploited at the spectral reflectance inflection point labeled C in FIG. 5. The alternate bright and dark appearance of the balloon material, or "blink," may be readily detected using a standard lock-in amplifier, Fourier analysis, Principal Component Analysis, or any related technique. This technique is applicable to any spectral region, including the room temperature thermal emissive regime (approximately 5000-12000 nanometers) rendering 24 hour detection feasible.

Figure 7:
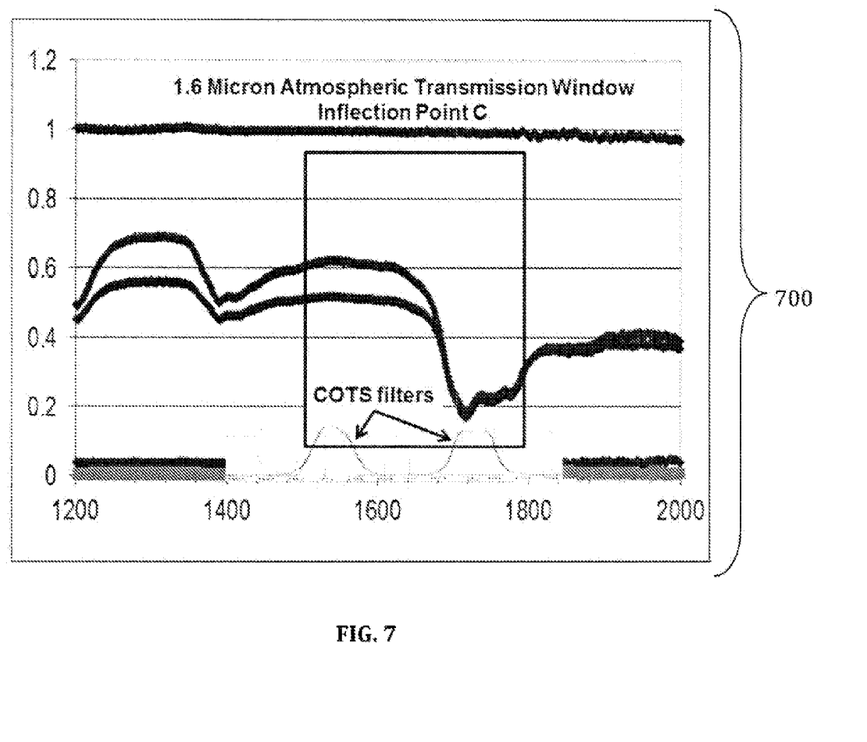
FIG. 7 illustrates a graph of a zoomed in area including two commercial off the shelf filters, sampling both sides of a spectral reflectance inflection point while remaining mostly within a atmospheric transmission window.
Figure 8:
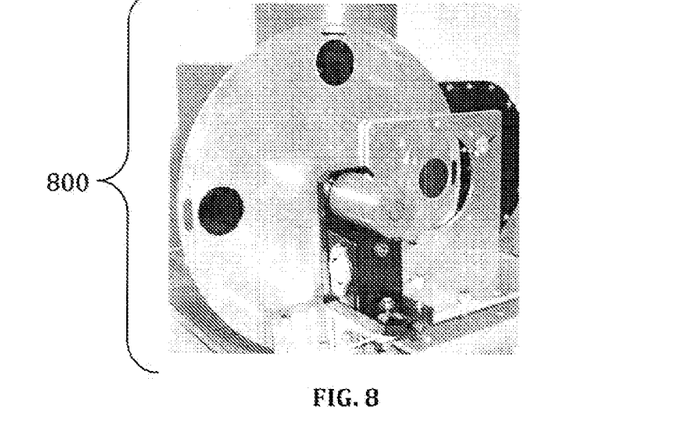
FIG. 8 illustrates a photograph of a filter wheel within which filters can be inserted in accordance with use as a module in the present invention.
Figure 9:
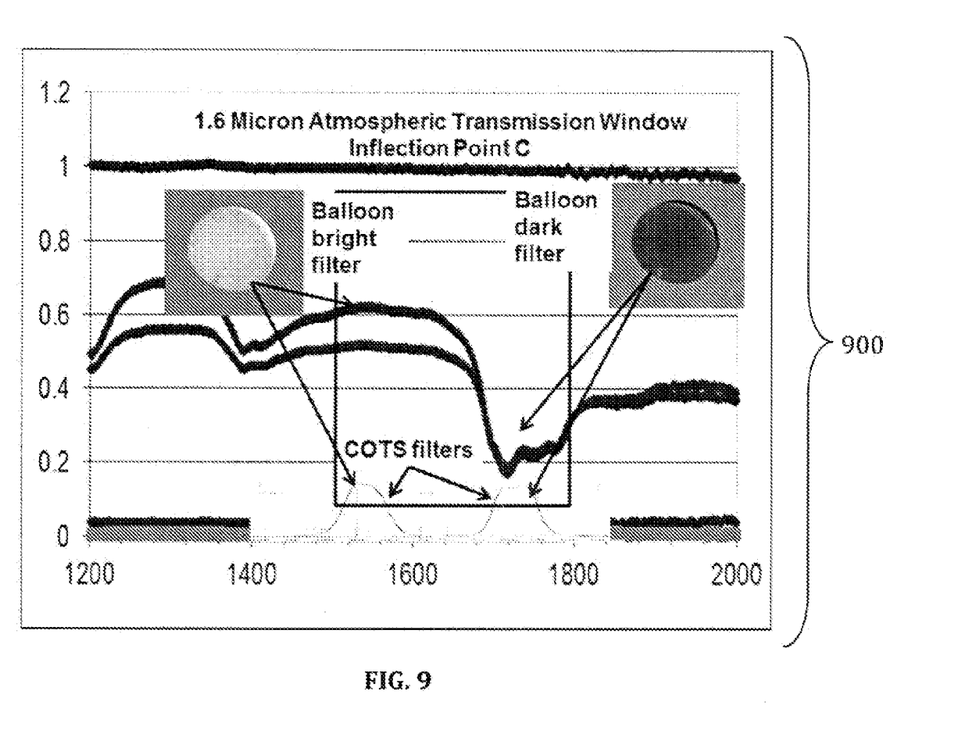
FIG. 9 illustrates a graph of results when a frame of data is taken each time a filter from the filter wheel in FIG. 8 is in front of the camera.

Referring to the graph in FIG. 7, a zoomed in area including two commercial off the shelf filters is shown, which sample both sides of the spectral reflectance inflection point while remaining mostly within the atmospheric transmission window. The filters could be better designed to sample the effect, but are adequate for proof of principle. The filters were next inserted into a simple rotating filter wheel, as shown in the photograph reproduced in FIG. 8. A frame of data was taken each time a filter was in front of the camera. The results are shown graphically in FIG. 9.

What is claimed is:

1. A method for detecting a target utilizing quantum mechanical transitions on a surface material of the target that produces an inflection in spectral reflectance, comprising:
   optically acquiring images as alternate, filtered data using a camera including a lens and at least two filters alternatively operating in front of the lens, wherein said filters alternatively sample brightest and darkest points around an inflection point along a spectral reflectance curve on a material of any target represented in the images;
   background balancing and differentiating alternate filtered data; and
   detecting anomalies in the alternate filtered data, wherein the anomalies represent a detected target.

2. The method for detecting a target utilizing quantum mechanical transitions on a surface material of the target that produces an inflection, in spectral reflectance of claim 1, wherein the two filters further comprise a rotating filter wheel including the two filters alternately covering the camera lens as the rotating, filter wheel moves in front of the lens and samples the brightest and darkest points around an inflection point in the spectral reflectance curve of the surface material of the target.

3. The method for detecting a target utilizing quantum mechanical transitions on a surface material of the target, that produces an inflection in spectral reflectance of claim 1, wherein the at least two filters alternatively operating in front of the lens or an electrically tunable filter producing at least two filtering conditions.

4. The method for detecting a target utilizing quantum mechanical transitions on a surface material of the target that produces an inflection in spectral reflectance of claim 1, wherein the target material is observed to alternate between bright and dark shades while the background remains one shade, wherein initial detection of the target is realized from alternating shades of the target material.

5. The method for detecting a target utilizing quantum mechanical transitions on a surface material of the target that produces an inflection in spectral reflectance, of claim 2, wherein the target material is observed to alternate between bright and dark shades while the background remains one shade, wherein initial detection of the target is realized from alternating shades of the target material.

6. The method for detecting a target utilizing quantum mechanical transitions on a surface material of the target that produces an inflection in spectral reflectance of claim 3, wherein the target material is observed to alternate between bright and dark shades while the background remains one shade, wherein initial detection of the target is realized from alternating shades of the target material.

7. The method for detecting a target utilizing quantum mechanical transitions on a surface material of the target that produces an inflection in spectral reflectance of claim 1, wherein the target is a balloon.

8. The method for detecting a target utilizing quantum mechanical transitions on a surface material of the target that produces an inflection in spectral reflectance of claim 5, wherein the target is a balloon.

9. The method for detecting a target utilizing quantum mechanical transitions on a surface material of the target that produces an inflection in spectral reflectance of claim 6, wherein the target is a balloon.

10. The method for detecting a target utilizing quantum mechanical transitions on a surface material of the target that produces an inflection in spectral reflectance of claim 1, wherein anomalies are detected using at least one of a standard lock-in amplifier, a Fourier Transform or Principal Component Analysis.

11. A method for detecting a balloon utilizing quantum mechanical transitions on a surface material of the balloon that produces an inflection in spectral reflectance, comprising;
    optically acquiring images as alternate filtered data using a camera including a lens and two filters alternatively operating in front of the lens, wherein said filters alternatively sample brightest and darkest points around an inflection point along a spectral reflectance curve on surface material of the balloon represented in the images;
    background balancing and alternate filtered data; and
    detecting anomalies in the alternate filtered data, wherein the anomalies represent a detected target.

12. The method for detecting a balloon utilizing quantum mechanical transitions on a surface material of the balloon that produces an inflection in spectral reflectance of claim 11, wherein the two filters further comprise a rotating filter wheel including the two filters alternately covering the camera lens as the rotating filter wheel moves in front of the lens and samples the brightest and darkest points around an inflection point in the spectral reflectance curve of the surface material of the balloon.

13. The method for detecting a balloon utilizing quantum mechanical transitions on a surface material of the balloon that produces an inflection in spectral reflectance of claim 11, wherein the at least two filters alternatively operating in front of the lens is an electrically tunable filter producing at least two filtering conditions.

14. The method for detecting a balloon utilizing quantum mechanical transitions on a surface material of the balloon that produces an inflection in spectral reflectance of claim 11, wherein the material is observed to alternate between bright and dark shades while the background remains one shade, wherein initial detection of the balloon is realized from alternating shades of the surface material.

15. The method for detecting a balloon utilizing quantum mechanical transitions on a surface material of the balloon that produces an inflection in spectral reflectance of claim 12, wherein the material is observed to alternate between bright and dark shades while the background remains one shade, wherein initial detection of the balloon is realized from alternating shades of the surface material.

16. The method for detecting a balloon utilizing quantum mechanical transitions on a surface material of the balloon that produces an inflection in spectral reflectance of claim 13, wherein the material is observed to alternate between bright and dark shades while the background remains one shade, wherein initial detection of the balloon is realized from alternating shades of the surface material.

17. A system for detecting a target utilizing quantum mechanical transitions on a surface material of the target that produces an inflection in spectral reflectance, comprising:
    a camera including a lens and two filters alternatively operating in front of the lens to optically acquire images as alternate filtered data, wherein said filters alternatively sample brightest and darkest points around an inflection point along a spectral reflectance curve on a material of any target represented in the images; and
    a microprocessor for background balancing the alternate filtered data, /differentiating the alternate filtered data and detecting anomalies in the alternate filtered data, wherein the anomalies represent a detected target.

18. The system for detecting a target utilizing quantum mechanical transitions on a surface material of the target that produces an inflection in spectral reflectance of claim 17, wherein the two filters further comprise a rotating filter wheel including the two filters types alternately covering the camera lens as the rotating filter wheel moves in front of the lens and samples the brightest and darkest points around an inflection point in the spectral reflectance curve of the surface material of the target.

19. The system for detecting a target utilizing quantum mechanical transitions on a surface material of the target that produces an inflection in spectral reflectance of claim 17, wherein the at least two filters alternatively operating in front of the lens is an electrically tunable filter producing at least two filtering conditions.

20. The system for detecting a target utilizing, quantum mechanical transitions on a surface material of the target that produces an inflection in spectral reflectance of claim 17, wherein the microprocessor, detects anomalies using at least one of a standard lock-in amplifier, a Fourier Transform or Principal Component Analysis.

* * * * *